UNITED STATES PATENT OFFICE.

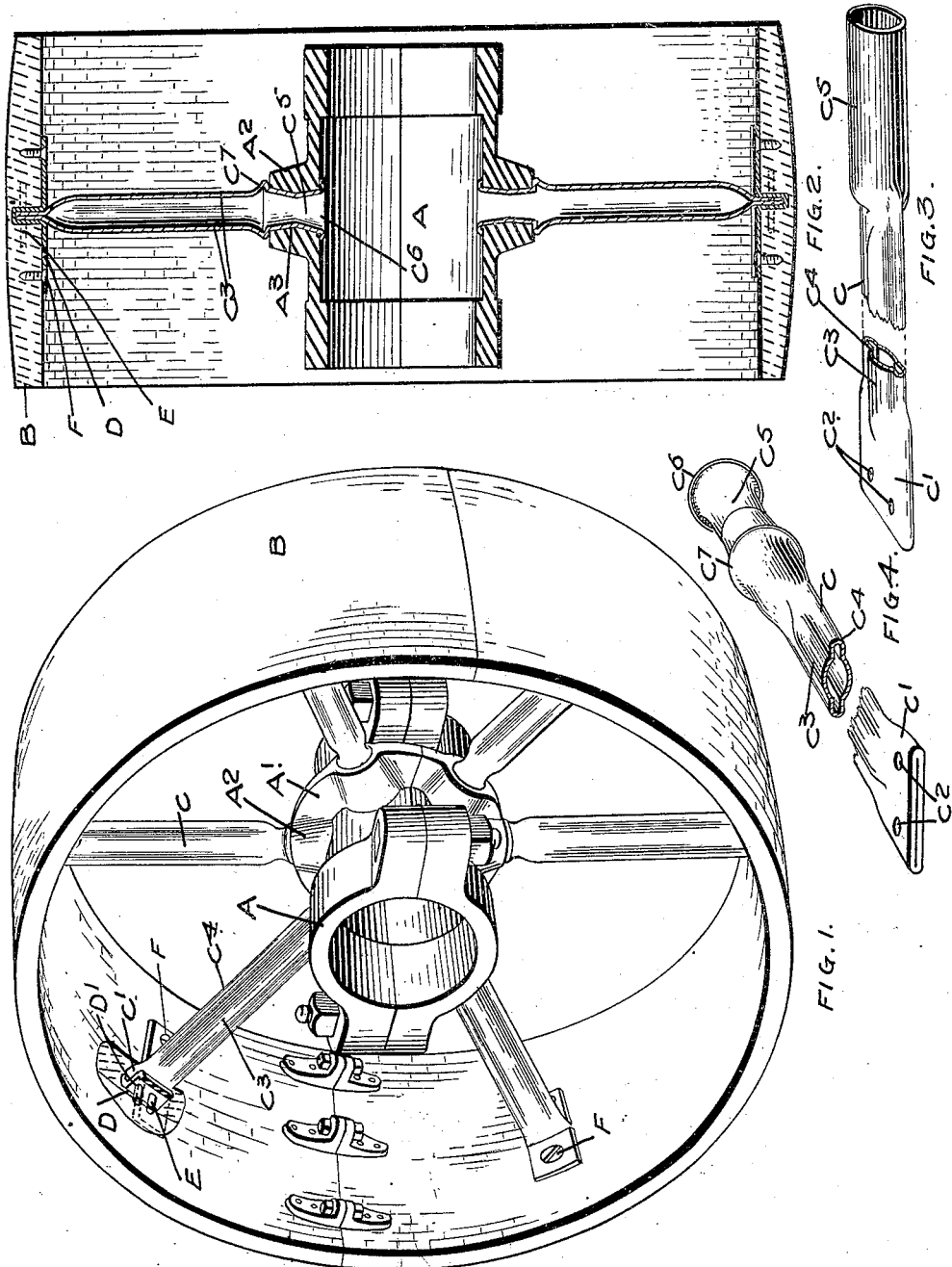

ROBERT HENNESSEY NOBLE, OF TORONTO, ONTARIO, CANADA, ASSIGNOR, BY DIRECT AND MESNE ASSIGNMENTS, OF ONE-THIRD TO THOMAS CHRISTOPHER HOOK AND ONE-THIRD TO CHARLES STEWART HOOK, OF TORONTO, CANADA.

PULLEY.

No. 917,479.      Specification of Letters Patent.      Patented April 6, 1909.

Application filed July 13, 1908. Serial No. 443,331.

*To all whom it may concern:*

Be it known that I, ROBERT HENNESSEY NOBLE, of the city of Toronto, in the county of York, in the Province of Ontario, Canada, have invented certain new and useful Improvements in Pulleys, of which the following is the specification.

My invention relates to improvements in pulleys having wood rims and metal centers, and the object of the invention is to devise a center for a pulley preferably of steel in which the hub spokes may be formed up and connected together without the use of rivets or screw threaded parts.

A further object is to produce the center cheaply and of a maximum strength for a minimum weight of metal.

To effect these objects I have constructed my pulley of a cast iron hub having spoke bosses provided with a double taper, and arms formed up of tubing and swaged to fit the taper at the inner end and compressed at the outer end to fit into the rim and a saddle secured to the inside of the rim in which the compressed ends of the hub fit, the parts being otherwise constructed and arranged in detail as hereinafter more particularly explained.

Figure 1, is a perspective view of a pulley constructed in accordance with my invention. Fig. 2, is a longitudinal section through the pulley. Fig. 3, is a perspective view of an arm or spoke of the pulley intermediately broken away and showing it in the form in which it is compressed previous to it being fitted in place in the hub. Fig. 4, is a perspective detail showing the arm in the form it assumes when it is inserted in place in the hub.

In the drawings like letters of reference indicate corresponding parts in each figure.

My invention is particularly adapted to a split pulley, although it may be equally adapted for a solid pulley.

A is the hub, which in the present instance, I show a divided one and provided with a central peripheral annular flange A′ having bosses $A^2$, which are each provided with a double tapered orifice $A^3$ tapering substantially from the center outwardly and inwardly.

B is the rim, which is made of a series of sections of wood fitted together in the usual manner known to makers of wood rim pulleys.

C are the spokes which are formed or pressed up out of a tube or pipe of wrought iron, which previous to being fitted in place are provided with flat outer ends C′ having pin holes $C^2$ central side ribs $C^3$ and edge ribs or flanges $C^4$ and tubular ends $C^5$. Previous to the rim being formed up the spokes are formed as in Fig. 3. The tubular ends are then inserted in the holder $A^3$ and held in a suitable holding clamp by which force is brought, so as to cause the tube to contract at the inner ends and enter the orifice $A^3$. A swage is provided at the inner side of the orifice, which when the tube emerges from the inner end of the orifice flares it out, so as to fit the orifice and form an inner annular flange $C^6$ (see Figs. 2 and 4). The tubes are held sufficiently far from the inner end when being forced inwardly, so that they are upset at the outside of the bosses to form annular ribs $C^7$. It will thus be seen that the arms are securely held from radial displacement both inwardly and outwardly. The outer flat ends of the arms C′ fit into a saddle plate D. Pins E as shown in full lines in Fig. 1, and dotted lines in Fig. 2, extend through pin holes $C^2$ in the flat outer ends C′ of the spokes C and the holes D′ in the straddle plate D, which register with them.

The rim is, of course, formed up after the hub and spokes are completed and the pins D′ are fitted into holes made in the rim during its formation. The straddle plates are secured to the rim by suitable screws F. It will thus be seen that a very strong connection is made at the outer end of the spoke or arm to the rim.

A pulley having a metal center formed as I have described is extremely strong and the spokes are secured in place both in the hub and the rim without any bolts or threaded part making the pulley one extremely cheap to manufacture and not liable to break apart during use.

What I claim as my invention is:

1. In a pulley, a tubular spoke having a tapered inner end, a flange formed to the outside of the taper, a circular tubular portion extending outwardly beyond the flange, a compressed intermediate portion elongated in cross section and formed up with side ribs, and an extreme outer end compressed into flat form of a maximum width for connecting the outer end to the rim, as specified.

2. The combination with the hub having tapered holes in its periphery, of a tubular spoke having a tapered inner end flaring outwardly at the extreme inner end to hold it in place and formed with side ribs and edge flanges and flat ends, and a rim, and means for suitably connecting it to the flat ends of each spoke or arm as and for the purpose specified.

3. The combination with the hub having tapered holes in its periphery, of a tubular spoke having a tapered inner end flaring outwardly at the extreme inner end to hold it in place and formed with side ribs and edge flanges and flat ends, and a rim, and pins extending through holes in the flat ends into the holes in the rim as and for the purpose specified.

4. The combination with the hub having tapered holes in its periphery, of a tubular spoke having a tapered inner end flaring outwardly at the extreme inner end to hold it in place and formed with side ribs and edge flanges and flat ends, and a rim, a straddle plate located to the inside of the rim and fastened thereto and pins extending through the holes in the flat ends and straddle plate and into holes in the rim as and for the purpose specified.

ROBERT HENNESSEY NOBLE.

Witnesses:
  B. BOYD,
  A. THOMAS.